UNITED STATES PATENT OFFICE.

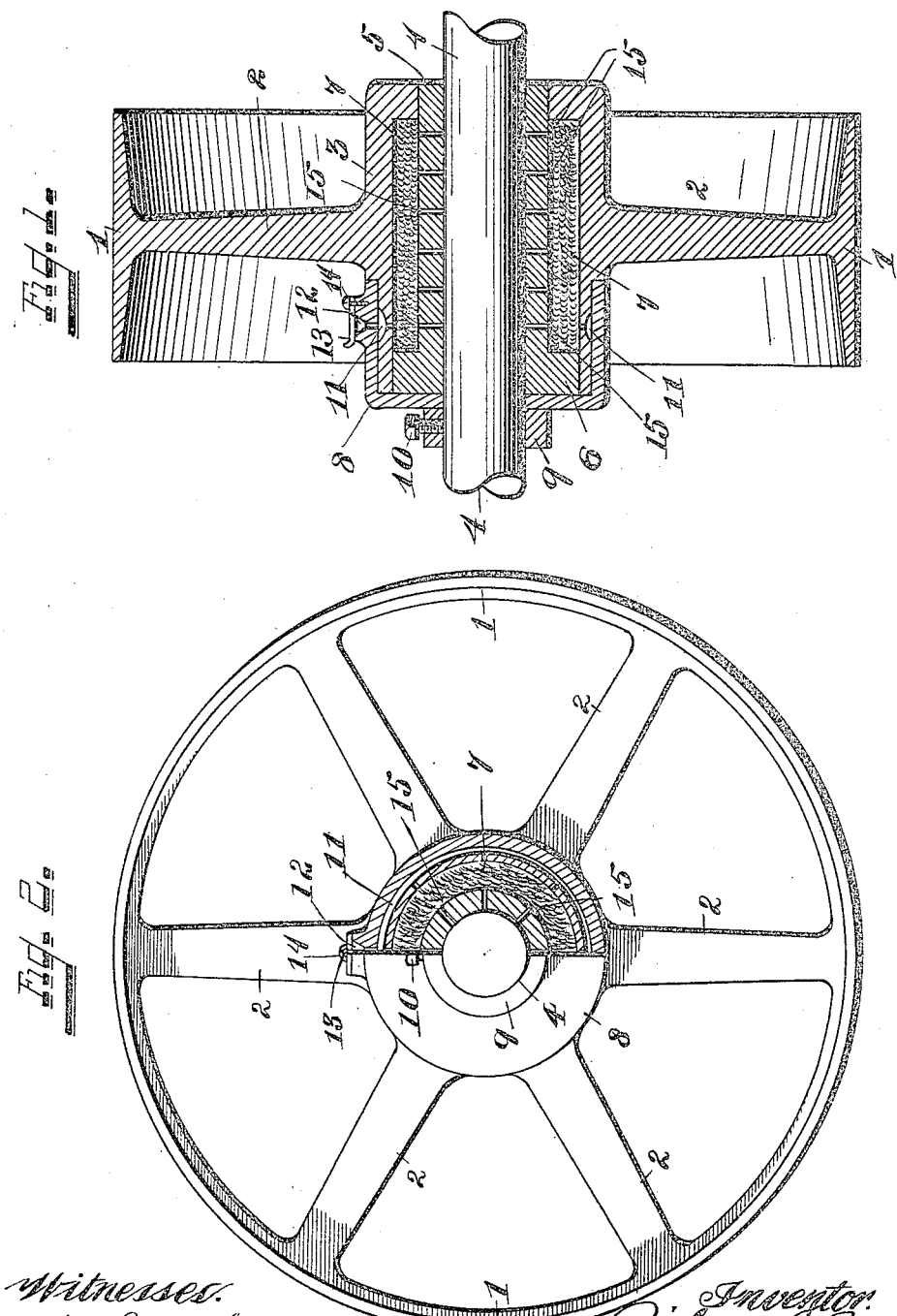

RICHARD C. NUGENT, OF CINCINNATI, OHIO, ASSIGNOR TO NICHOLAS PAUL FENNER, JR., OF CINCINNATI, OHIO.

LOOSE PULLEY.

No. 817,724.      Specification of Letters Patent.      Patented April 10, 1906.

Application filed January 23, 1904. Renewed August 19, 1905. Serial No. 274,964.

*To all whom it may concern:*

Be it known that I, RICHARD C. NUGENT, a citizen of the United States, residing at Cincinnati, in the county of Hamilton and State of Ohio, have invented certain new and useful Improvements in Loose Pulleys, of which the following is a full, clear, and exact description, reference being had to the accompanying drawings, forming part of this specification.

My invention relates to loose pulleys which are especially designed for use on countershafts, though they are capable of use on line-shafts or in any other position where a loose pulley is required; and it has for its object an improved hub construction whereby self-oiling mechanism is provided therein and in which the oil can be replenished at any time without stopping the pulley The means employed which embody my invention are very simple in construction and efficient in action, and the novelty of my invention will be hereinafter more fully set forth and specifically pointed out in the claim.

In the accompanying drawings, Figure 1 is a central sectional end elevation of a loose pulley embodying my invention. Fig. 2 is a side elevation of the same with one-half of the hub portion in section.

The same numerals of reference are used to indicate identical parts in both the figures.

The pulley may be of any suitable construction, whether of wood or of metal, and I have here represented it as entirely of metal, with a rim 1, spoke-arms 2, and a hub portion 3, all cast together.

4 is the shaft, upon which the pulley is secured in the following manner: The enlarged hub of the pulley 3 is counterbored from one end nearly to the opposite end, as seen in Fig. 1, and a bronze bushing 5 fits over the shaft with its right-hand end, as seen in Fig. 1, fitting snugly through the smaller bore in the end of the hub, and its opposite end is enlarged to form a head 6, which fits in the end of the counterbored part of the hub. This leaves quite a space between the outer periphery of the bronze bushing and the inner counterbored part of the hub, and this space is filled with an absorbent material 7, which is preferably of felt or other non-cutting material.

Over the end of the hub next to the head 6, which portion of the hub is slightly reduced in diameter, is fitted a cap 8, held in place by a collar 9 upon the shaft 4, secured by a set-screw 10. Beneath the cap 8, where it surrounds the reduced end of the hub, is a circumferential groove 11, into which an aperture 12 in a boss on the cap 8 enters to form a filling-hole for the lubricant, and this filling-hole is covered by a pivoted cover 13, secured upon the boss by a set-screw 14 or in any other suitable manner.

Extending through the bushing 5 are a series of apertures 15, which lead from the absorbent material 7 to the surface of the shaft 4 and by means of which the lubricant is conveyed to the shaft. Generally speaking, loose pulleys are employed as parts of friction-clutch mechanisms, as well as being used by the side of fast pulleys, and these devices so fit against the end of the loose pulley or its hub on the side opposite the collar 9 as to hold the pulley from slipping longitudinally on its shaft.

The cap 8, while fitting comparatively snug upon the hub 3, is not rigidly secured thereto, and at any time while the pulley is running said cap may be grasped and held fast without stopping the pulley, the cover 13 be opened, and a fresh charge of lubricant be introduced through the filling-hole 12 to saturate the absorbent material 7.

By this simple construction I provide a loose pulley which is a self-oiler, requiring very little attention, and having few if any parts to wear, though should the bushing wear it can be readily taken out and replaced by a new one, and in the same manner should the absorbent material become packed or clogged it may be readily removed and a new packing of absorbent material substituted therefor.

Having thus fully described my invention, I claim—

In loose-pulley construction, the hub provided with a counterbore to receive a bushing, a bushing fitted within said hub serving to center the pulley on the shaft and provided with perforations extending through the same from the counterbore in the hub to the shaft, said bushing having an enlarged head at one end to fill the counterbore in the end of the hub, its opposite end fitting in the bore of the hub, a cap loose upon the end of the hub and covering the same and the enlarged end of the bushing, there being a filling-hole in said cap communicating with a circumferential groove in the end of the hub, and perforations from said circumferential groove into the space of the counterbore between the hub and bushing, and absorbent material surrounding the bushing within the counterbore of the hub, whereby said absorbent material can be charged with lubricant at any time without stopping the running of the pulley, substantially as described.

RICHARD C. NUGENT.

Witnesses:
　EDWARD PECK,
　EDWARD SUSSDORF.